United States Patent
Callari et al.

(10) Patent No.: US 6,529,627 B1
(45) Date of Patent: *Mar. 4, 2003

(54) GENERATING 3D MODELS BY COMBINING MODELS FROM A VIDEO-BASED TECHNIQUE AND DATA FROM A STRUCTURED LIGHT TECHNIQUE

(75) Inventors: Francesco Callari, Fremont, CA (US); Arthur Zwern, San Jose, CA (US); Sandor Fejes, San Jose, CA (US)

(73) Assignee: Geometrix, Inc., San Jose, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 09/710,438

(22) Filed: Nov. 10, 2000

Related U.S. Application Data

(63) Continuation of application No. 09/344,319, filed on Jun. 24, 1999, now Pat. No. 6,415,051.

(51) Int. Cl.[7] .................................................. G06K 9/00
(52) U.S. Cl. ..................... 382/154; 382/285; 382/291; 345/653; 345/664; 345/679; 356/3.1
(58) Field of Search ................................ 382/154, 276, 382/285, 291, 293; 345/419, 426, 427, 653, 661, 664, 619, 676, 679; 356/3.1, 3.01

(56) References Cited

U.S. PATENT DOCUMENTS

| | | | |
|---|---|---|---|
| 205,243 A | * 6/1878 | Migdal et al. ............... 382/154 |
| 4,842,411 A | * 6/1989 | Wood ............................ 356/2 |
| 4,989,981 A | * 2/1991 | Kawamura et al. .......... 356/394 |
| 5,003,166 A | * 3/1991 | Girod ....................... 250/201.4 |
| 5,668,631 A | * 9/1997 | Norita et al. ................ 356/376 |
| 5,760,925 A | * 6/1998 | Saund et al. ................. 358/497 |
| 5,812,269 A | * 9/1998 | Svetkoff et al. ........ 250/559.23 |
| 5,862,252 A | * 1/1999 | Yamamoto et al. .......... 345/419 |
| 5,889,550 A | 3/1999 | Reynolds ..................... 348/139 |
| 5,987,591 A | * 11/1999 | Jyumonji ..................... 700/259 |
| 6,064,759 A | * 5/2000 | Buckley et al. .............. 348/125 |
| 6,128,405 A | * 10/2000 | Fujii ............................ 382/154 |
| 6,407,817 B1 | * 6/2002 | Norita et al. ............... 356/3.04 |

OTHER PUBLICATIONS

Bouguet et al, "3D Photography On Your Desk", Proceedings of International Conference on Computer Vision, Bombay, India, Jan. 1988, pp. 43–50.

* cited by examiner

*Primary Examiner*—Jayanti K. Patel
*Assistant Examiner*—Ali Bayat
(74) *Attorney, Agent, or Firm*—John Zheng

(57) ABSTRACT

A 3D modeling system employing a commercially available structured light source is disclosed. The light source projecting a light stripe is swung manually across an object or a particular area of interest on the surface of the object. Under the illumination of the swinging light stripe, the object is imaged to produce a sequence of images. For each of the images, the position and orientation of the structured light source are independently and dynamically derived. From each of the images, a set of curvilinear points from the (deformed) projected line falling on the object or the area of interest are calculated in conjunction with a calibration model of the imager. The curvilinear points from all the images are merged to provide accurate and complete 3D data about the object or the area of interest.

43 Claims, 10 Drawing Sheets

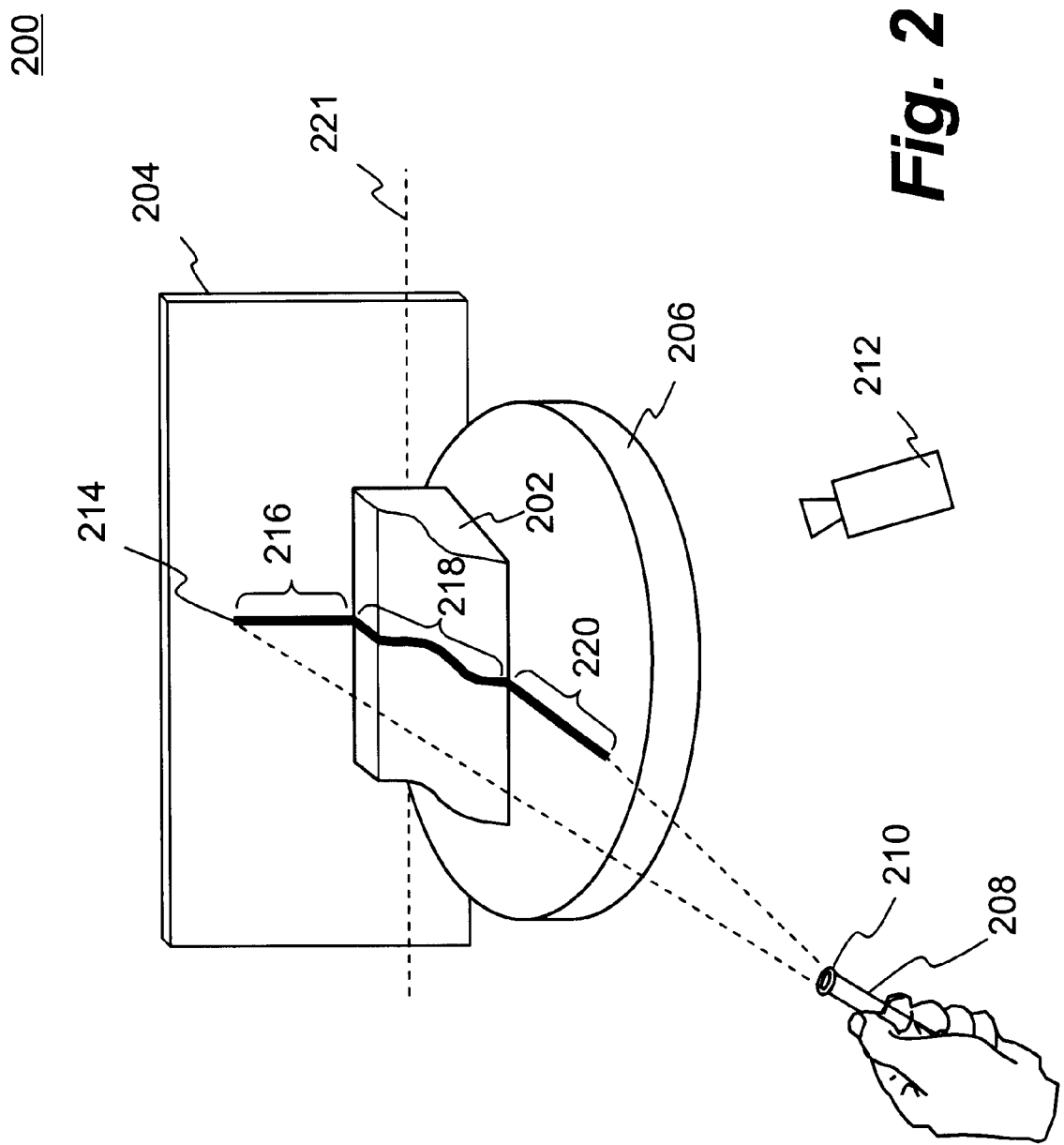

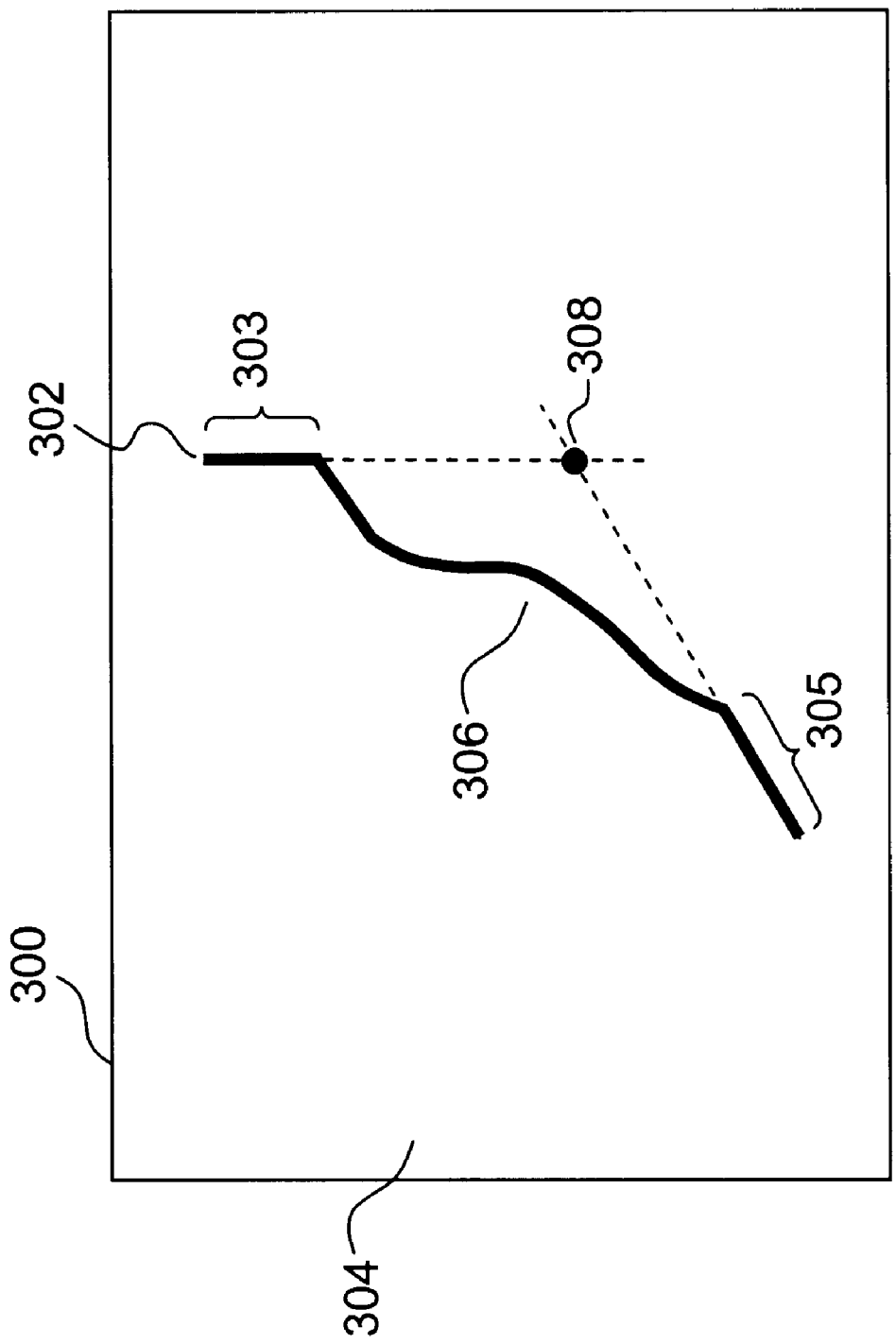

GENERATING 3D MODELS BY COMBINING MODELS FROM A VIDEO-BASED TECHNIQUE AND DATA FROM A STRUCTURED LIGHT TECHNIQUE

The present application is a continuation of U.S. application Ser. No. 09/344,319, filed Jun. 24, 1999, now U.S. Pat. No. 6,415,051.

BACKGROUND OF THE INVENTION

1. Field of the Invention

The present invention generally relates to 3-dimensional scanning and measuring systems and more particularly relates to a system for generating accurate and complete 3-dimensional models from objects using a structured light source operated manually by an operator.

2. Description of the Related Art

Three-dimensional (3D) models of objects can provide information useful for a variety of applications such as generating computer aided design models from physical objects in product designs, outlining biological structures or organs in medical research and simulating natural scenes for training. Nevertheless, the creation of the 3D models has in the past required highly skilled professionals, extensive artistic knowledge, expensive modeling equipment and laborious efforts.

With the popularity of personal computers and the rapid emergence of the Internet and the World Wide Web (www), there are increasing demands from non-professionals for 3D modeling systems that require no extensive knowledge to operate. For example, a business may need to generate 3D models of its products and present them on its www site to attain its e-commence presence. A real estate agent may need to provide prospective buyers with an interactive preview of properties without driving around. A child may want to generate a 3D image of one of his/her favorite new toys to share by the Internet with a relative living remotely. The various applications and demands have proclaimed features of such 3D modeling systems that must be low in cost and easy in operation.

One of the commonly used 3D modeling systems is a triangulation system projecting beams of laser light onto an object. Ordinarily, the reflected light bounces off the object at an angle relative to the light source. The system employing an imaging system collects the reflection information from a different location relative to the light source and then determines the coordinates of the point or points of reflection by triangulation. A single dot system projects a single beam of light which, when reflected, produces a single dot of reflection. A scanning line system sends a plane of light against the object, the plane of light is reflected as a curvilinear-shaped set of points describing one contour line of the object. The location of each point in that curvilinear set of points can be determined by triangulation. The accuracy of the systems may be high but the systems are costly. The triangulation in the systems requires a precise configuration between the light source and the imaging system. Further the digitizing speed is usually slow when the object is large in size and limited by the mechanics of the scanning system.

Another commonly used 3D modeling approach is image based systems employing one or more imaging systems located at known locations or distances from each other to take multiple images of a 3D object. The captured images are processed with a pattern recognition system that corresponds the various points of the object in the multiple images and triangulates to extract depth information of these points, thereby obtaining the shape/contour information of the 3D object. However, it is known that some concave portions of the 3D object's surface can be unobservable to the imaging systems, which may result in errors in final 3D models.

Recent product introductions, technological advancements, and price cuts have made imaging systems ubiquitous, so it is likely that image based systems will be one of the most popular 3D modeling systems to generate 3D models of objects for many applications. There is therefore a great need for a mechanism that can complement the image based 3D modeling systems to create accurate 3D models with minimum effort.

SUMMARY OF THE INVENTION

The present invention has been made in consideration of the above described problems and needs and has particular applications for image-based 3D modeling systems. According to one aspect of the present invention, a commercially available structured light projector such as a laser pointer projecting a stripe is employed and swung manually across a particular area of interest on the surface of an object. The particular area of interest includes typically those hidden curvatures that are unobservable or otherwise difficult to be imaged by a camera-based imager. Under the illumination of the swinging laser stripe, the object is successively imaged to produce a sequence of images. From each of the images, a set of curvilinear points from the (deformed) projected line falling on the area of interest are calculated in conjunction with a calibration model of the imager. As used herein, a set of curvilinear points mean a group of successive points or pixels representing surface curvatures of a 3D object, graphic illustrations thereof are provided wherever appropriate. The curvilinear points from all the images are then merged to provide accurate and complete 3D data about the area of interest. The 3D data can be incorporated to correct, modify or otherwise enrich a 3D model derived from an image-based modeling system. As such a precise 3D model of the object can be generated with minimum effort.

According to another aspect of the present invention, the laser pointer is swung manually across a 3D object while several or surrounding views of the object are imaged by an imager, in which either the imager is moved around the object or the object is rotated. According to the same principles, for each of the views, sets of curvilinear points describing contours of the object are calculated. All the curvilinear points from all the views are then "stitched" together to derive a 3D model of the object.

According to still another aspect of the present invention, a pair of flat panels are used to provide a reference for dynamically determining the position of a manually operated light source projecting a light stripe onto a 3D object. The flat panels, such as a turntable and a background reference, are configured to a known angle, preferably 90° to form a bifurcated or angled background. An object to be modeled is placed on a horizontal plane and in front of a vertical plane or simply in front of the two angled planes. When the object is illuminated by the light stripe being swung repeatedly (e.g. back and forth or up and down), the scene is imaged by a pre-calibrated imager to produce a sequence of images. Each of the images includes two non-deformed reflected light segments reflecting the projected light stripe falling respectively on the two flat panels. By detecting the two light segments in each of the images, the position and orientation of a light sheet intersecting the two light segments are derived so as to determine the position and orientation of the stripe from the light source. Thus a dynamic calibration of the light source is achieved.

The invention can be implemented in numerous ways, including a method, system, computer readable medium containing program code for generating a 3D model of an object using a structured light source projecting a plane of light or stripe. Each has achieved unexpected results and benefits.

The advantages of the invention are numerous. Different embodiments or implementations may yield one or more of the following advantages. One of them is an economical and efficient supplemental mechanism that can be employed to obtain accurate, complete, and timely as-built geometry information of a particular area of an object or a large structure. Another one is an extremely high level of detail of the particular area of the interest the present invention can provide. For those narrow or deep concavities, the user can swing the laser from a position closer to the imager to increase the coverage of the narrow/deep concavities. Still another one is the reduction to practice of an extremely low-cost 3D modeling system using a structured light source operated manually. Conventional 3D modeling systems using structured light sources require precise configuration between the light sources and an imaging device. In contrast, the present invention provides an approach to dynamically calibrate/determine the position of the light source projecting a light stripe by initially detecting the light stripe falling on two flat panels that form an angled background, thereby requiring no fixed configuration between the light source and the imaging device. As a result, a user is now allowed to swing the light stripe from any position with respect to the imager to illuminate any particular area of the interest of an object or objects of any sizes to derive 3D models thereof. In addition, the dynamic calibration may be performed using a portion of wall/floor or two walls of any room, or the wall/ground of any building exterior. Thus large objects such as furniture and automobiles may be scanned and modeled electronically.

Other advantages, benefits, objects and features of the present invention, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2 illustrates an object placed in a modeling system simplified from FIG. 1A;

FIG. 3 shows an image containing a recorded projected line;

DETAILED DESCRIPTION OF THE PREFERRED EMBODIMENTS

The present invention discloses a method and system for modeling 3D objects using a handheld structured light source projecting a light stripe. In conjunction with a calibration model of an imager, the position of the light source is dynamically calibrated so that curvilinear-shaped set of points describing contours of the 3D objects can be derived to model the 3D objects without requiring a fixed configuration between the light source and the imager.

In one application, a manually operated laser pointer is employed to complement an image based 3D modeling system to create accurate 3D models with minimum effort. For objects with curvatures that are difficult to be imaged, the present invention reveals those curvatures to an imager in the 3D modeling system and generate curvilinear-shaped set of points to correct, modify or otherwise enrich the representation of those curvatures in final 3D models. The curvatures may include cavities and obscured surfaces. According to one aspect of the present invention, a laser pointer projecting a stripe is manually controlled to illuminate the curvatures, and the deformation of projected laser lines is imaged and analyzed. Together with the known calibration model of the imager, a 3D model of the object can be precisely generated.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 1A:
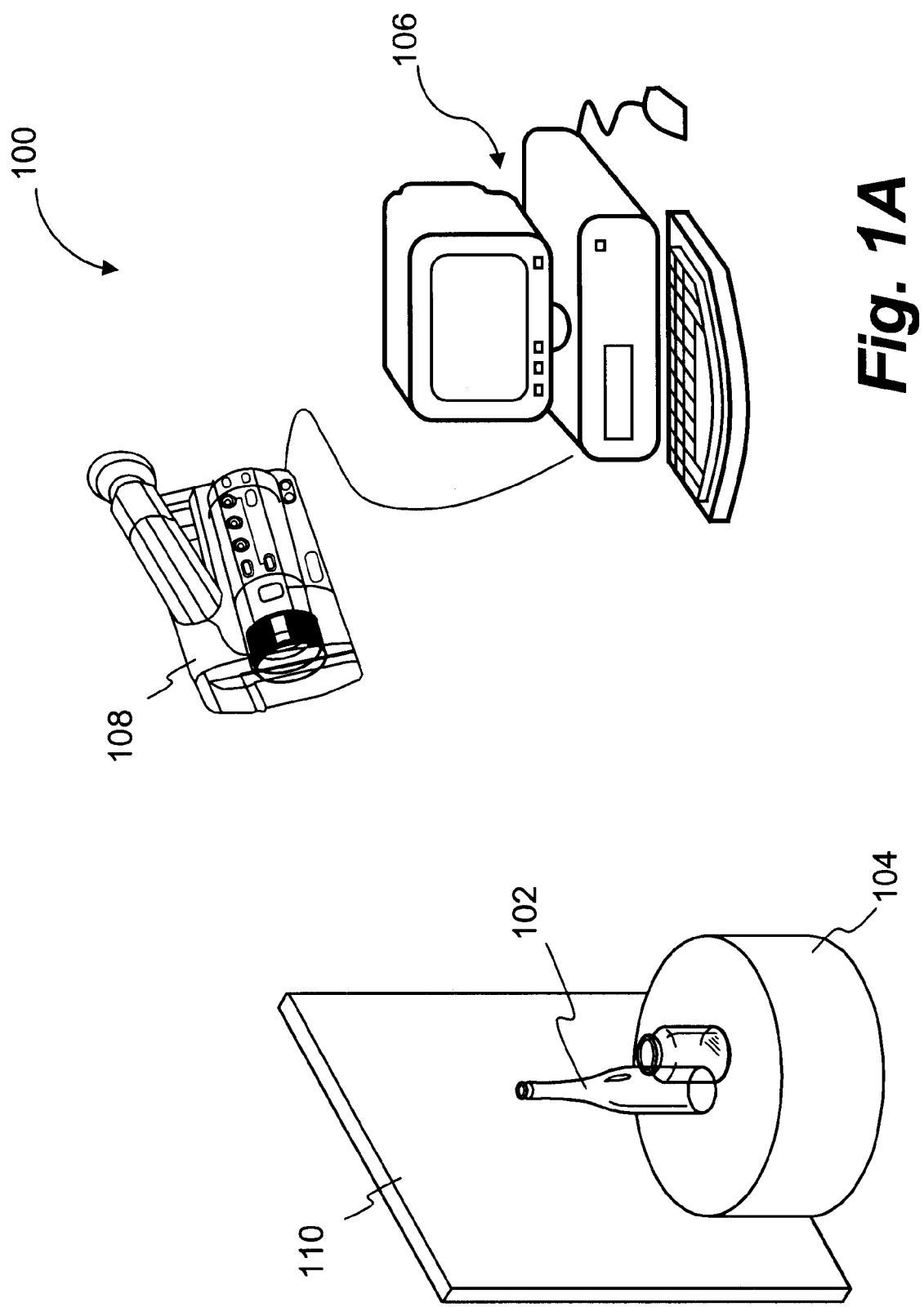
FIG. 1A demonstrates a system in which the present invention may be practiced.

Referring now to the drawings, in which like numerals refer to like parts throughout the several views. FIG. 1A demonstrates a system 100 in which the present invention may be practiced. A 3D object 102 to be imaged is placed on a turntable 104 that is preferably controlled by a stepper motor (not shown). The stepper motor operates under the control of a computer system 106 to rotate turntable 104 at a set of predefined angles as such object 102, when being turned around, can be viewed and imaged by an imaging system 108 that subsequently produces a sequence of images.

According to one embodiment, turntable 104 is made of round shape and flat surface to avoid possible jittering movement when being rotated. The stepper motor that drives turntable 104 is coupled to computer system 106 through a serial port thereof. Imaging system or imager 108 that is also coupled to computer system 106 through a Universal Serial Bus (USB) or alternatively a second serial port thereof may be a digital video camera. One of the commercially available digital video cameras is Kodak DVC-323 from Eastman Kodak. Imager 108 may be alternatively an image capturing device. In the case that the image capturing device produces only analog signals, those skilled in the art understand that a frame grabber may be installed in computer system 106 to digitize the analog signals so as to produce the digital image data. Without limiting the scope of the present invention, it is assumed that computer system 106 receives digital images data from imaging system 108 in the following description.

In addition, background panel 110 is provided for two purposes; to provide simple background to the object 102 to facilitate efficient process of images in computer system 106 and to provide a vertical reference when the present invention is practiced as explained detail below.

Figure 1B:
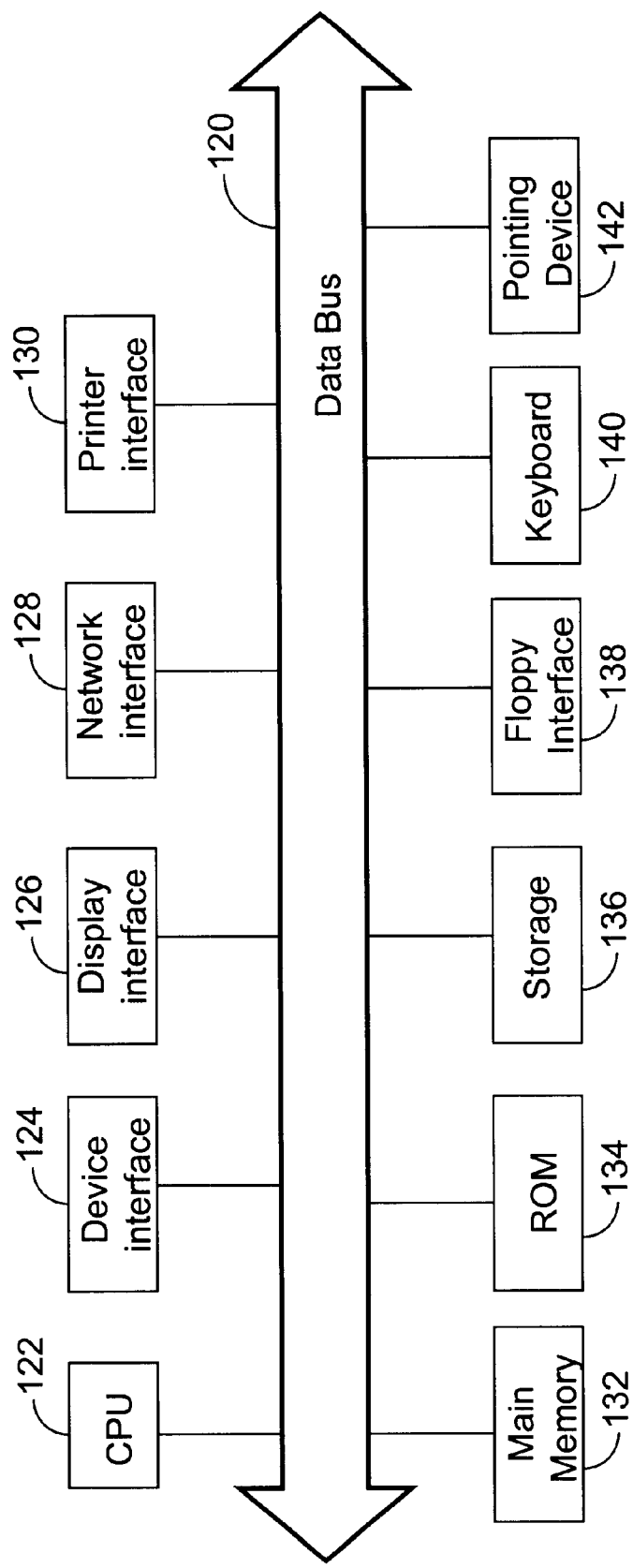
FIG. 1B shows a block diagram of a preferred internal construction of computer system that may be used in the system of FIG. 1A.

Computer system 106 may be a computing system that may include, but not be limited to, a desktop computer or a laptop computer. FIG. 1B shows a block diagram showing a preferred internal construction of computer system 106. As shown in FIG. 1B, computer system 106 includes a central processing unit (CPU) 122 interfaced to a data bus 120 and a device interface 124. CPU 122 executes certain instructions to manage all devices and interfaces coupled to data bus 120 for synchronized operations and device interface 124 may be coupled to an external device such as imaging system 108 hence image data therefrom are received into a memory or storage through data bus 120. Also interfaced to data bus 120 is a display interface 126, network interface 128, printer interface 130 and floppy disk drive interface 138. Generally, a compiled and linked version of one embodiment of the present invention is loaded into storage 136 through floppy disk drive interface 138, network interface 128, device interface 124 or other interfaces coupled to data bus 120.

Main memory 132 such as random access memory (RAM) is also interfaced to data bus 120 to provide CPU 122 with the instructions and access to memory storage 136 for data and other instructions. In particular, when executing stored application program instructions, such as the complied and linked version of the present invention, CPU 122 is caused to manipulate the image data to achieve desired results. ROM (read only memory) 134 is provided for storing invariant instruction sequences such as a basic input/output operation system (BIOS) for operation of keyboard 140, display 126 and pointing device 142 if there are any.

In operation, a calibration model of camera 108 is first calculated. The calibration model is a mathematical model that describes how an image is formed, i.e. how points in the 3D space are projected onto an image sensor that results in the image. There are a number of parameters to be determined in the calibration model. The parameters are essentially grouped in two categories, intrinsic and extrinsic parameters. The intrinsic parameters related directly to the imager may include various distortion compensation coefficients, the focal length and field of view of the imager as well as the projection of the focal point of the imager onto an image sensor therein. The extrinsic parameters may include a spatial location of the focal point, the orientation of the focal axis and the image sensor with respect to the 3D space. According to one embodiment of the present invention, the calibration procedures proposed by Tsai, R. Y., "A Versatile Camera Calibration to Technique for High Accuracy 3D Machine Vision Metrology Using Off-the Shelf TV Cameras and Lenses", IEEE *Journal of Robotics and Automation*, Vol. RA-3, No. 4, August 1987, which is hereby incorporated by reference, is used to derive those parameters in the calibration model of camera 108. In other words, the camera or imager 108 must be pre-calibrated with respect to a stationary target that is typically turntable 104 or background panel 110.

After the calibration model is obtained, object 102 is rotated and synchronized while imager 108 takes a sequence of snapshots (images) that are sequentially loaded into computer system 106. An application executed in computer 106 first processes each of the images respectively with or without respect to a background reference taken before object 102 is imaged to derive a sequence of silhouette or mask images. Based on the mask images, a space model of the object may be constructed using approaches such as space carving techniques. Further processing of the space model including application of texture information result in a 3D model of the object. The detailed description of an exemplary application is provided in commonly assigned U.S. Patent Provisional Application No. 60/093,335, filed Jul. 20, 1998, entitled "Generation of Fully-Textured 3D Models System", which is hereby incorporated by reference in its entirety.

Figure 1C:
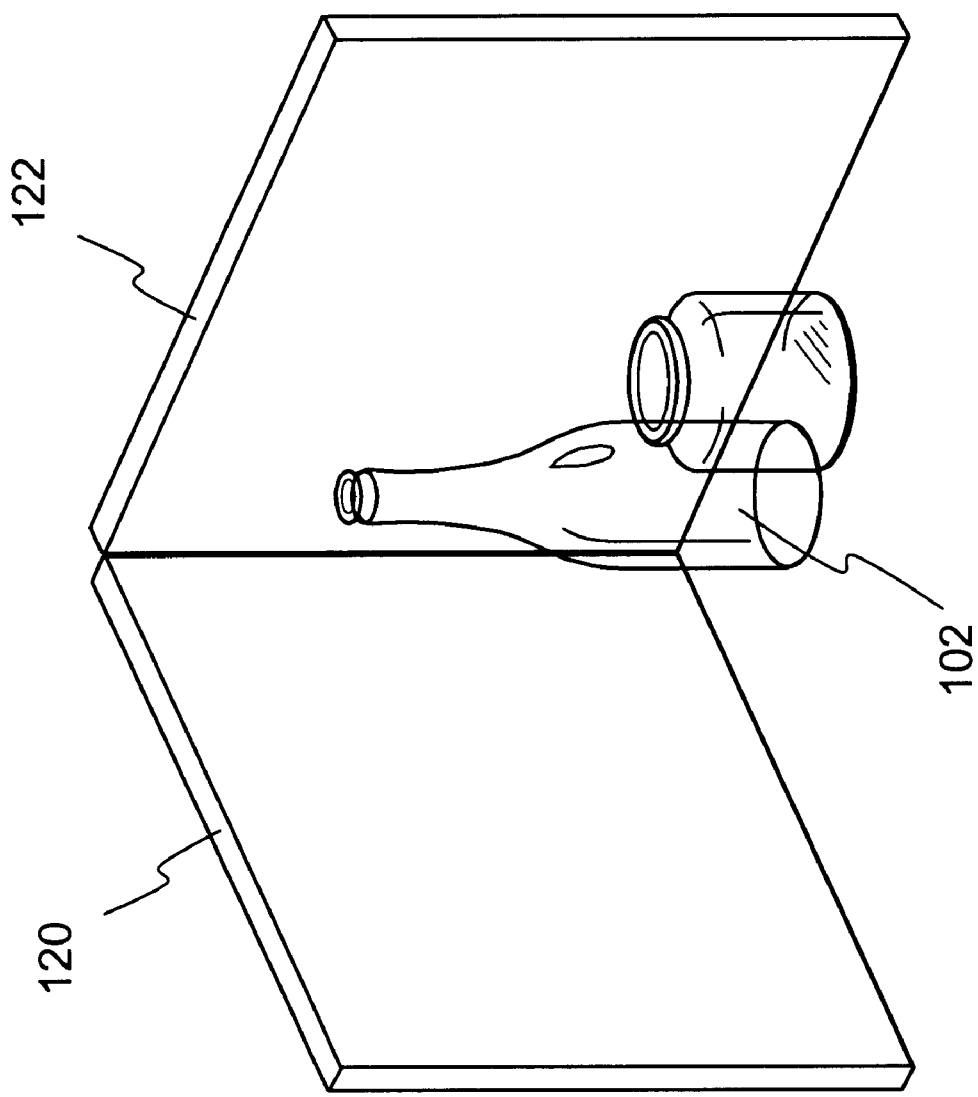
FIG. 1C illustrates another exemplary configuration of two flat panels configured to a known angle to form an angled background and both behind an object.

FIG. 1C illustrates another exemplary configuration of two flat panels in which planes 120 and 122 are configured to a known angle to form an angled background and behind object 102. This configuration may be used for an object that is not applicable to be placed on a platform. As will be appreciated in the following description, the exact configuration of the panels or angled background does not affect the operation of the invention as long as there is a background having two reference panels to be projected upon by a structured light stripe. To facilitate the description of the present invention, the configuration in FIG. 1A will be used and the word "turntable", "platform" or simply "plane" are interchangeably used herein to indicate that an object is placed thereon and as a first reference, "background reference plane" or simply "plane" are also interchangeably used herein to indicate as a second reference. Those skilled in the art will understand that the same description is equally applied to other possible configurations of the angled background.

Referring to FIG. 2; there is illustrated an object 202 placed in a modeling system 200 simplified from FIG. 1A. Background reference panel 204 and platform 206 have preferably flat surface and configured to be perpendicular to each other. Clearly any two non-shiny flat panels (a vertical and a horizontal panel) may be used in the place of the platform and the background reference panel to practice the present invention. A structured light source 208, preferably a handheld laser pointer, projects a beam of stripe (e.g. a vertical thin line) 210 onto object 202 from a position offset to imager 212. One exemplary laser pointer that may be used is the commercially available Laserlyte FM 650 Laser Pointer from Lyte Optronics (see www.lyteoptronics.com).

As a result, the projected line 214 from stripe 210 results into a number of visually distinct segments, each of the segments falling on a different part in the scene. Non-deformed end portions, line segments 216 and 220 are results of projected line 214 falling on background reference panel 204 and platform 206, respectively. Perceivably, deformed portions 218 are results of projected line 214 falling on the surface of object 202, revealing the structure or contour of the surface or curvatures on object 202.

To facilitate the operation of the present invention, the projected line 214 from stripe 210 is controlled to fall on both background reference panel 204 and platform 206 while laser pointer 208 is swung manually across the scene or a particular area of interest of object 202. That means object 202 is visually enclosed by background reference panel 204 and platform 206 so that at any time the projected line 214 falls on background reference panel 204 and platform 206. To be even more specific, at any time and any angle, object 202 is surrounded by background reference panel 204 and platform 206 in an image. In accordance with the present invention, imager 212 is operated to take snapshots of the scene to produce a sequence of images recording the movement of projected line 214.

According to one embodiment of the present invention, any other illumination sources provided to illuminate object 202 for imaging by imager 212 are preferably turned off or dimmed. Object 202 is thus primarily illuminated by stripe 210. Images taken under such conditions have the projected line 214 enhanced without including complicated texture information from object 202 in the images. It should be pointed out that it is not necessary to shade the texture information in the scene in order to practice the present invention, a preferred imaging control just makes it more efficient to process the captured images.

In addition, imager 212 is adjusted to take two or more images every second. Since laser pointer 208 is operated manually and slow in reference to the speed of the image captures, motion blurring of projected line 214 in images is minimized. Further, the movement of projected line 214 across object 202 is preferably monotonous or back and forth along a horizontal direction in reference to the projected setting in FIG. 2.

FIG. 3 shows an image 300 containing recorded projected line 302 from projected line 214 of FIG. 2. Preferably image 300 is a preprocessed image with background pixels 304 not corresponding to recorded projected line 302 all turned off. One of the approaches to achieve this is first to take a snapshot of the scene with the object as a reference image. When the laser pointer is in operation to illuminate the object, an actual image of the illuminated object is taken. The reference image is then subtracted from the actual image. As a result, a preprocessed image with only the trace of the projected line is obtained regardless of the format the actual image may be originally presented in (e.g. color or gray). Alternatively, a luminance image may be used directly in which pixels with high intensity representing the projected line are used. After a few steps of processes, for example, edge or peak detection, line thinning or line fitting, black and white image 300 can be obtained to have only recorded projected line 302.

Image 300 includes the non-deformed line segments 303 and 305 resulting from projected line 214 falling on background reference panel 204 and platform 206 and the deformed segments 306 resulting from projected line 214 falling on the surface of object 202. To uniquely determine the space positions of the projected line 214 falling on the surface of object 202, the non-deformed line segments 303 and 305 must be first detected and the positions thereof are then derived with respect to the position of the imager.

Figure 4B:
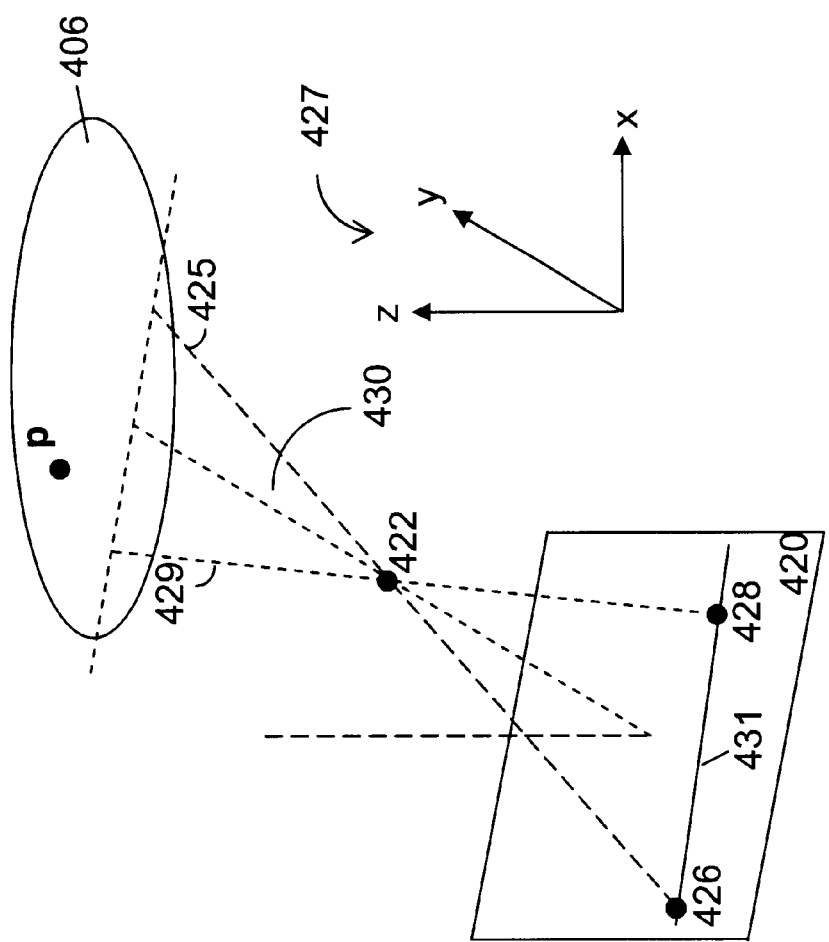
FIG. 4B shows an optical model of an image sensor in an imager used to image a 3D object being placed with respect to the optical model.
Figure 4A:
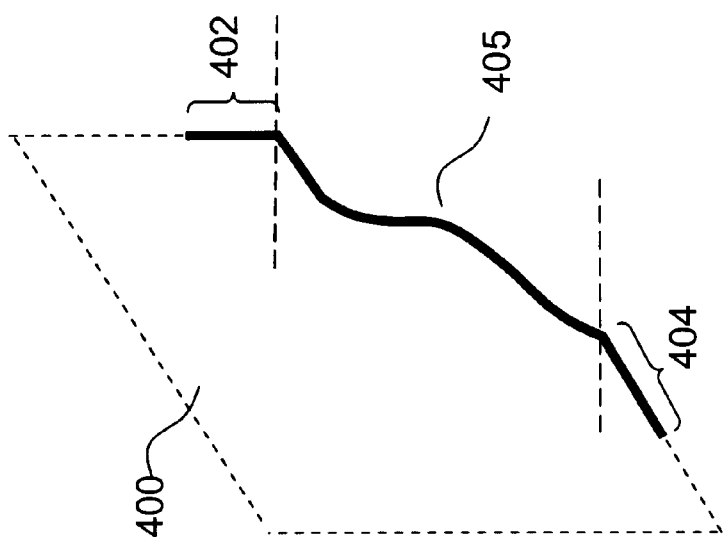
FIG. 4A shows a light plane intersecting two reference panels to form respectively two straight line segments.

With respect to FIGS. 2 and 3, FIGS. 4A–B show a dynamic detection of a light plane originated from the laser pointer and intersecting with the two panels so as to determine the positions of deformed projected light 218. FIG. 4A shows light plane 400 intersecting line segments 402 and 404. Line segments 402 and 404 correspond respectively to the non-deformed portions, line segments 216 and 220 of FIG. 2 or line segments 303 and 305 of FIG. 3A. Based on the preceding known conditions, it is concluded that segments 402 and 404 must be in light plane 400, hence the problem of deriving light plane 400 is reduced to a problem of determining the locations and orientations of lines 402 and 404. It is known in geometry that each line in a 3D space is uniquely determined by two planes, the problem of determining the lines further reduces to determining two pairs of planes. Of these, one in each pair, plane 204 or 206, is essentially known.

FIG. 4B shows an optical model of an image sensor 420 in imager 212 used along with a computer system executing program code implementing one embodiment of the present invention to generate the preprocessed images and should be understood in conjunction with FIG. 2. The optical model provides the geometry to determine a light plane from a projected line segment. Plane 406 corresponding to platform 206 can be expressed in 3D space 427 as follows:

$$N_{406} \cdot p = d_{406}$$

where $N_{406}$ is a normal vector, p is coordinates of a point on the platform, and $d_{406}$ is a scalar value representing a distance from the origin of space 427 to plane 406.

Similarly, optical path or view ray 425 falling on a given image point 426 of sensor 420 is expressed by:

$$q = f + \lambda D_{425}$$

where q is the coordinates of any point of view ray 425 in 3D space 427, f is the coordinates of the sensor's focal point 422, $D_{425}$ is the unit vector of the calibrated orientation corresponding to image point 426 and $\lambda$ is a scaling factor.

By extension, a "view plane" corresponding to a pair of image points 426 and 428 is defined as a plane 430 containing view rays 425 and 429. Specifically, the two view rays projecting the two image points 426 and 428 are expressed as follows:

$$\begin{cases} q = f + \lambda D_{425} \\ q = f + \mu D_{429} \end{cases}$$

which concludes the equation of view plane 430 as follows:

$$N_{430} \cdot p = d_{430}$$

wherein:

$$N_{430} = (\|D_{425} \times D_{429}\|)^{-1} \|D_{425} \times D_{429}\|$$

$$d_{430} = f \cdot N_{430}$$

It should be noted now that plane 430 is the view plane intersecting all the points in line 431 lying on image plane 420 and line 431 is determined by points 426 and 428. Conversely, any line on the image plane 420 uniquely determines a plane in 3D space.

Image points 404 in. FIG. 4A are identified as being the projection of projected line 220 on plane 206 and have been represented by a straight line. Thus, any two points on this line yield the equation of a view plane $\Pi_h$ in 3D space which contains—by construction—the projected line 220. Hence, the location and orientation of line 404 in 3D space 427 can be readily computed by intersecting this view plane and plane 206, i.e. by solving for points p of an underdetermined system of linear equations as follows:

$$\begin{cases} N_h \cdot p = d_h \\ N_{206} \cdot p = d_{206} \end{cases}$$

where $N_h$ and $d_h$ are, respectively, the unit normal vector and distance of the computed view plane $\Pi_h$. The computed solution has the form:

$$p = p_0 + \lambda D_{220}$$

where $D_{420}$ is the unit vector and $p_0$ is one of the points.

The next step is to derive the same for line segment 402 reflecting the projected line falling on plane 204. It is assumed that imager 212 is pre-calibrated with respect to plane 206 in the above. The location and orientation of plane 204 must be determined first. The orientation can be computed from the known angle between planes 206 and 204. Further, a line search process, which is to be described in detail below, is designed to derive for each image an s intersection point 308 of line segments 303 and 305. These interaction points (one per image) belong to the image projection of line 221. Line 221 itself can then be recovered by fitting a straight line to all the interaction points and intersecting in the 3D space a view plane $\Pi_i$ corresponding to the straight line and the already known plane 206. Points p of line 221 are then the solution of an under-determined system of linear equations of the form:

$$\begin{cases} N_i \cdot p = d_i \\ N_{206} \cdot p = d_{206} \end{cases}$$

where $N_i$ and $d_i$ are, respectively, the unit normal vector and distance of the computed view plane $\Pi_i$. The plane of the background target 204 is then recovered as the unique plane which contains the derived line 221 and lies at the prior known angle with respect to plane 206. It is expressed by an equation of the form as follows:

$$N_{204} \cdot p = d_{204}$$

As described above, the non-deformed line segments 216 and 220 are determined from each of the preprocessed images and hence light plane 400 can be readily determined. Logically, segment 405 corresponding to deformed portions 218 of FIG. 2 can be separated from segments 402 and 404. Consequently, image 300 is left with only deformed portions that lie in light plane 400. The deformed portions are in essence a set of curvilinear points representing the surface curvatures of the 3D object.

It may be appreciated by now that light plane 400 is independently determined from each of the preprocessed images. In other words, projections of a structured light stripe are independent from one image to another. One of the advantages provided herein is the dynamic detection of the light source, which eliminates the need for a precise fixed configuration between the light source and the imager.

Figure 4C:
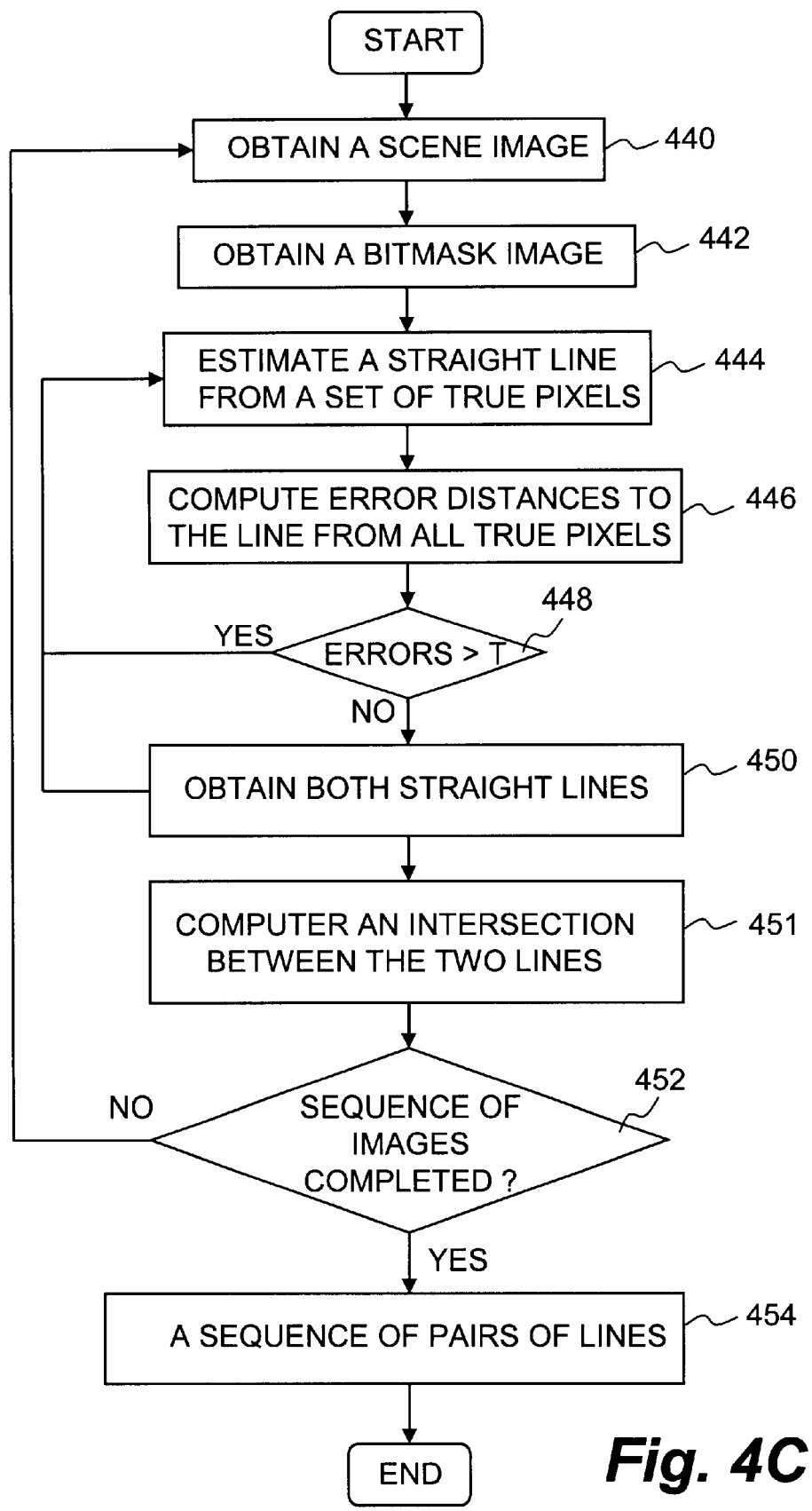
FIG. 4C shows a (line search) process flowchart of detecting non-deformed line segments according to an embodiment of the present invention.

With respect to FIG. 3, FIG. 4C shows a (line search) process flowchart of detecting the non-deformed line segments 303 and 305 according to an embodiment of the present invention. As described above, for each position of the object, there are generated a sequence of images, each capturing a trace of the projected light line. At 440, each of the images is processed independently to obtain a corresponding preprocessed image at 442. From the preprocessed image, two end straight lines, such as non-deformed line segments 302 and 306, are determined at 444.

Given the following known conditions:
1. two panels, namely the platform and the background reference panel, are positioned with a known angle therebetween (e.g. 90°);
2. both of the two panels surround the object from the imager perspective; and
3. both of the straight lines are respective projections from the same light stripe onto the two configured panels.

the line search process starts therefore from an estimated area in which one of the two straight lines may be present or from the boundary of the preprocessed image. To be specific, a set of "on" pixels is found and a line is estimated. At 446, a distance measurement is carried out for the set of "on" pixels towards the estimated line and all errors are then added up. If the total error is smaller than a predefined threshold (T), the processes 444 and 446 are repeated by fitting the line recursively as long as the total error is less than the threshold.

At 450, both straight lines are respectively obtained in the fashion described above or other line estimation and fitting techniques that are known to those skilled in the art. At 451, an intersection point, such as crossing point 308 of FIG. 3, between the straight lines is derived. At 452, it is verified that each of the images has been processed to obtain the two straight lines. At 454, the line detection process has collected a sequence of pairs of lines from the images. Each of the lines may be represented with a collection (coordinates) of the pertinent "true" pixels or simply a line equation.

Referring back to FIG. 3, a crossing or intersection point 308 is calculated from the two line equations, respectively, representing line segment 303 and 305. For each pair of the lines, a similar crossing point can be calculated. Two or more of the crossing points thus form a unique (intersecting) line that represents where two planes 204 and 206 are intersects. As described above, the intersecting line is useful in determining dynamically the position and orientation of plane 204 and shown as a dash line 221 in FIG. 2.

Figure 5:
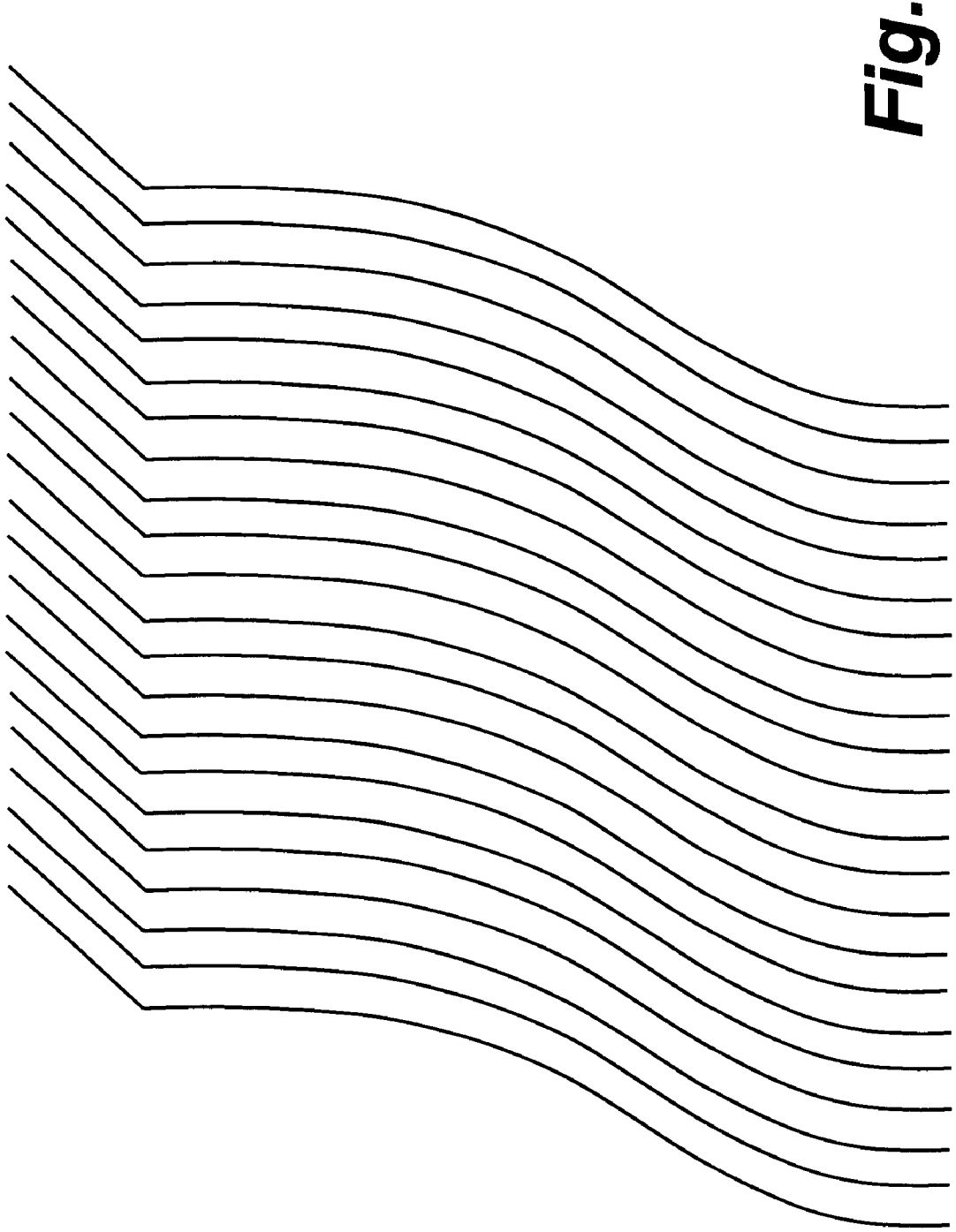
FIG. 5 illustrates the merged sets of curvilinear points that are derived from respective images.

After the determination of space coordinates of the curvilinear points, the next step is to merge or superimpose the measurements, namely, the curvilinear points, of each of the images. As described above, multiple images are taken while the laser pointer is swung horizontally across the object, which essentially results in a large displaced set of curvilinear points. FIG. 5 illustrates the merged sets of curvilinear points 500 that are derived from respective images and define the surface of the object.

As described above, the present invention may be used to generate a complete model of a 3D object. According to one aspect of the present invention, the laser pointer is manually operated and pointed to an area of interest. Curvilinear points 500 in FIG. 5 thus represent the area of interest on the surface of a 3D object. Typically, the area of interest, such as a cavity, can not be represented faithfully in an image that is taken without the illumination of the laser stripe. The cavity would be therefore modeled erroneously. One of the important features in the present invention is the derived curvilinear points that can be now referenced to correct, modify or otherwise enrich the modeling of the cavity. As a result, there is provided a precise 3D model of an object with minimum efforts.

Figure 6A:
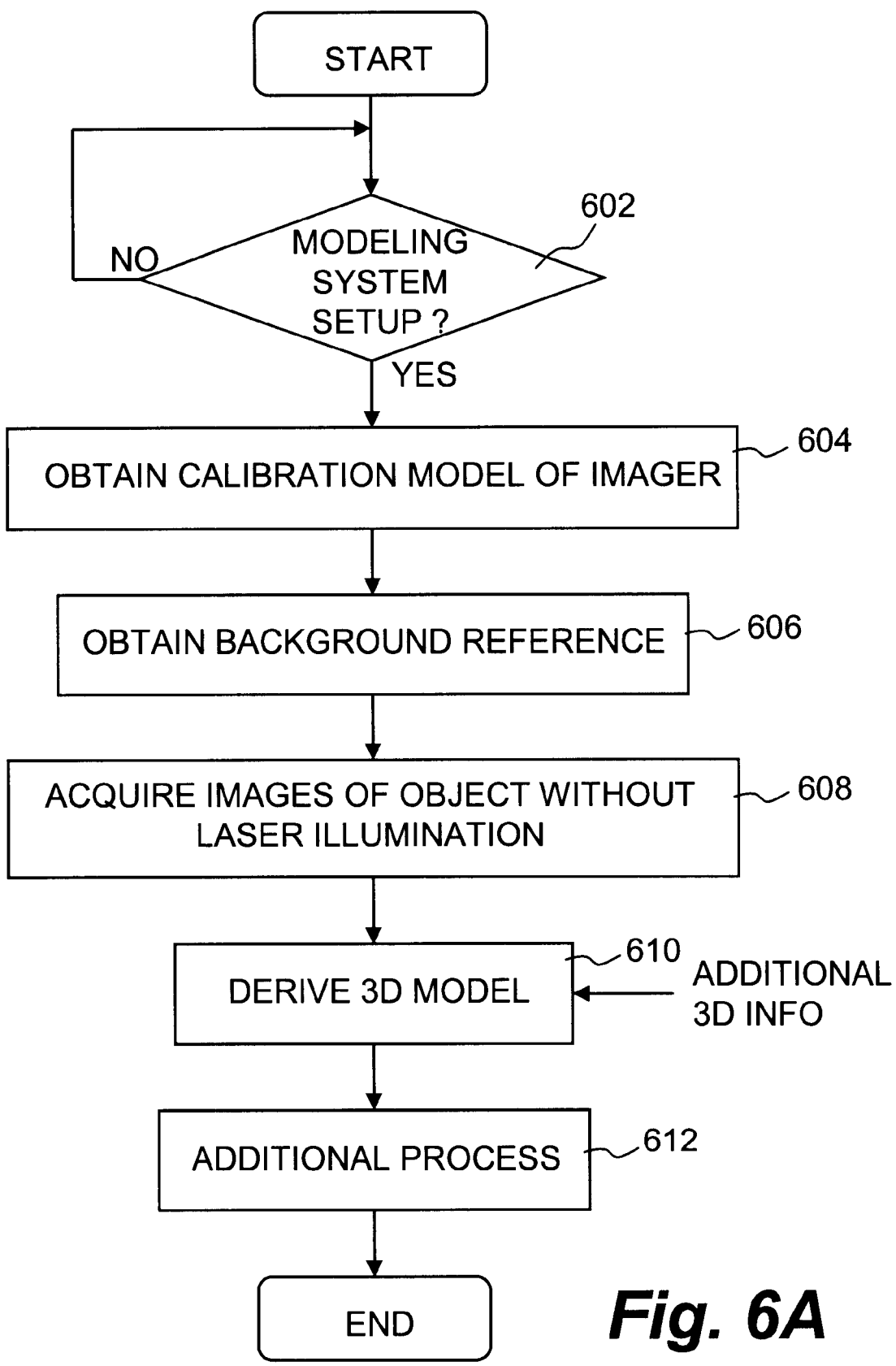
FIGS. 6A and 6B together show a process flowchart of the present invention according to one embodiment thereof.
Figure 6B:
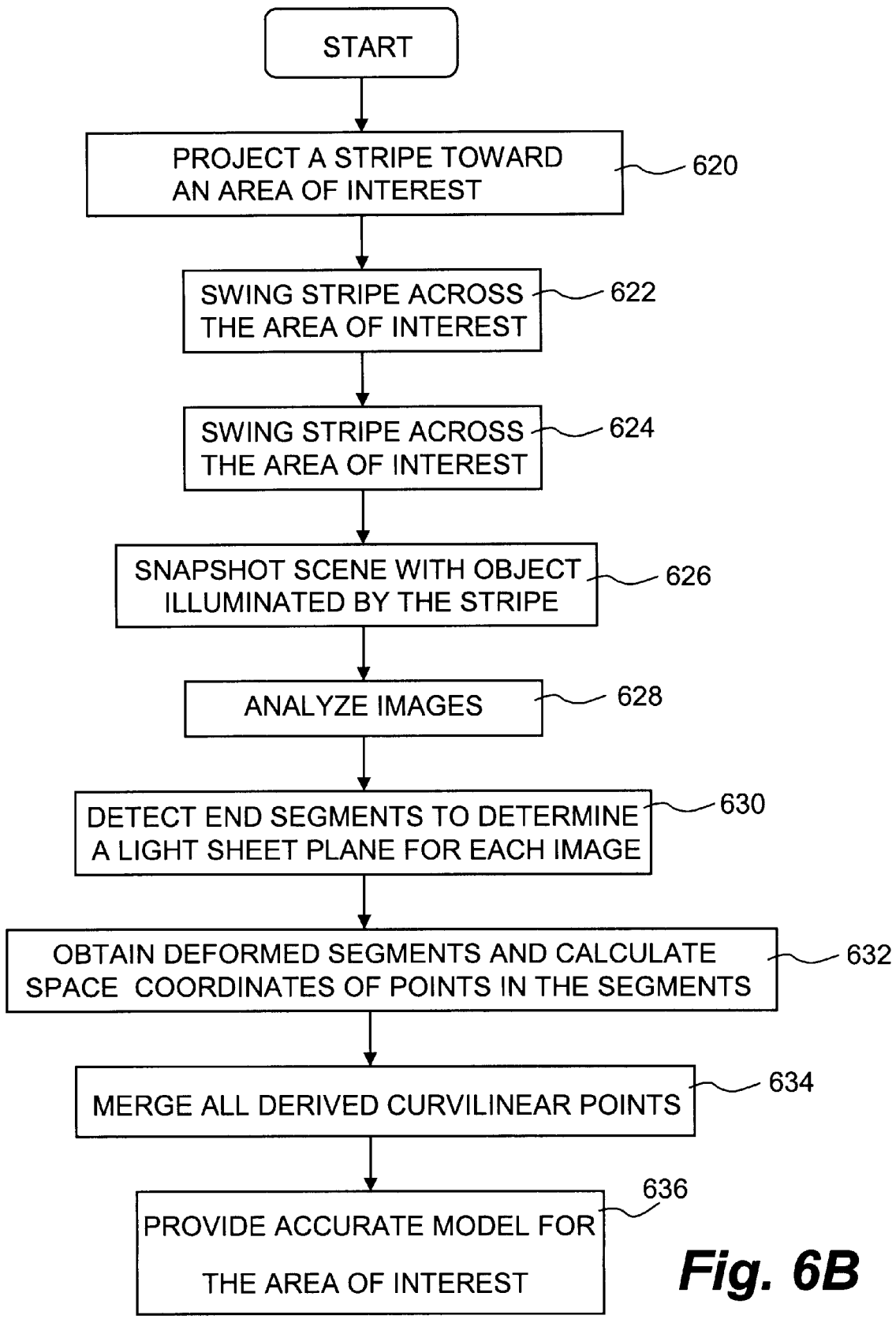

FIGS. 6A and 6B shows a process flowchart of the present invention used to provide precise 3D data about a particular area of interest according to one embodiment thereof and shall be understood in conjunction with previous figures. At 602 of FIG. 6A, a modeling system such as the one illustrated in FIG. 1 must be first established and the platform and the background reference panel are set up to a known angle, preferably a right angle (90°). At 604, the calibration model of the imager is obtained by imaging, for example, a calibration target. By measuring the distortion of the target in the image, the positions of the imager with respect to the platform are known. At 606, a background reference is taken and stored. The background reference image helps to isolate image portion of the object from the rest of background when images of the object are captured at 608. Typically, with the known calibration model of the imager and the available image portions of the object, a process of deriving a 3D model of the object may be proceeded at 610.

As described above, one important aspect of the present invention is an efficient supplemental process that derives more accurate 3D data to be supplied to the process at 610 so that a precise 3D model of the object can be obtained.

Specifically, at 620 of FIG. 6B, an operator of the modeling system projects a laser stripe from a laser pointer onto areas that may introduce errors in the modeling processing in FIG. 6A. The typical areas include those hidden curvatures and cavities that could be hardly represented in 2D images obtained at 608 of FIG. 6A. At 622, the operator swings the laser pointer across the areas with the requirement that both ends of the projected laser line fall respectively on the platform and the background reference panel. Meanwhile, the scene in which the object is being illuminated by the laser stripe is imaged sequentially at 626. All the images are analyzed first 628, which includes the subtraction of the background and detection of the projected laser lines. Occasionally, some of the images may not capture the projected laser lines and others may have blurred lines. Known to those skilled in the art, all can be cleaned at this analyzing step. Additionally, a line thinning or line fitting scheme may be applied to ensure the projected laser lines are precisely positioned in the processed images.

At 630, the light plane is derived by first detecting those points representing the portion of projected laser line falling on the platform and the background reference panel, which is followed by the mathematical determination of the lines. At 632, the deformed segments representing the projected laser line falling on the area of interest are extracted and the space coordinates of the points thereon are derived with respect to the calibration model of the imager. At 634, all curvilinear points from each of the images are merged. The data representing a true model of the area of interest are provided at 636.

Referring back to FIG. 6A, the modeling process at 610 is proceeded in conjunction with the 3D data provided from block 636 of FIG. 6B. A complete and accurate 3D model of the object can be thus derived. In addition, other processes may be provided to perfect the 3D model at 612. The processes may include texturing and fine turning the 3D model.

Those skilled in the art may appreciate that process in FIG. 6B may be used alone to provide 3D data of an object as opposed to modeling an area of interest. When the laser stripe swings across the entire object and a sequence of images are taken, the curvilinear points obtained at 634 provide the essential 3D information for the object at a particular angled position. The process can be repeated for each of surrounded views, all the essential 3D information can be then "stitched" to derive a complete set of 3D data of the object.

The present invention has been described in sufficient detail with a certain degree of particularity. It is understood to those skilled in the art that the present disclosure of embodiments has been made by way of examples only and that numerous changes in s the arrangement and combination of parts as well as steps may be resorted without departing from the spirit and scope of the invention as claimed. Accordingly, the scope of the present invention is defined by the appended claims rather than the forgoing description of embodiments.

We claim:

1. A method for generating a 3D model of an object, the method comprising:

generating an initial 3D model of the object from a sequence of first images from an imager based on a calibration model of the imager, the object placed in reference to a platform, wherein the calibration model determines relationships between the imager and the platform;

obtaining, respectively, 3D data of certain areas of the object from a sequence of second images taken by the imager when a structured light beam is swung across respectively the certain areas of the object; and deriving the 3D model by integrating the 3D data into the initial 3D model.

2. The method of claim 1, wherein each of the certain areas of the object has its own geometrical shape which, without being illuminated by the structured light beam, is unobservable or otherwise difficult to be imaged by the imager.

3. The method of claim 1 further comprising obtaining the calibration model of the imager before the first images are taken.

4. The method of claim 3, wherein the generating of the initial 3D model comprises:

receiving the sequence of first images from the imager, each of the first images representing a snapshot of the object from an angle; and deriving the initial 3D model from the sequence of first images based on the calibration model.

5. The method of claim 4, wherein the initial 3D model includes inaccuracy for at least one of the certain areas of the object.

6. The method of claim 5, wherein the deriving of the 3D model comprises:

applying the 3D data to the at least one of the certain areas of the object so that the inaccuracy can be corrected.

7. The method of claim 4, wherein the obtaining of the 3D data comprises:

detecting, from the sequence of second images, respective deformations of projection of the structured light beam falling on each of the certain areas of the objects;

deriving 3D contours from the respective deformations; and merging the 3D contours to generate the 3D data.

8. The method of claim 7, wherein the platform includes a pair of a first panel and a second panel, the first panel and the second panel are configured to a known angle and behind the object.

9. The method of claim 8, wherein the laser stripe is projected on the first panel and the second panel simultaneously at any given time.

10. The method of claim 7, wherein the platform includes a pair of a first panel and a second panel, the first panel and the second panel are so configured that each of the first images shows that the object is surrounded by the first panel and the second panel.

11. The method of claim 10, wherein the laser stripe is projected on the first panel and the second panel simultaneously at any given time.

12. The method of claim 1, wherein the structured light beam is a laser stripe projected from a laser projector.

13. The method of claim 12, wherein the laser projector is not positioned a priori in reference to the platform.

14. The method of claim 13, wherein the laser projector is a handheld type and manually operated.

15. The method of claim 1, wherein the initial 3D model includes inaccuracy for at least one of the certain areas of the object.

16. The method of claim 15, wherein the deriving of the 3D model comprises applying the 3D data to the at least one of the certain areas of the object so that the inaccuracy can be corrected.

17. A method for generating a 3D model of an object, the method comprising:

providing a modeling system including an imager and a platform, the imager and the platform maintaining relationships expressed In a calibration model of the imager;

taking a sequence of first images of the object by the imager to generate an initial 3D model of the object, wherein the object is placed in reference to the platform; and taking a sequence of second images of the object by the imager while using a structured light beam to illuminate respectively certain areas of the object to obtain 3D data of the certain areas of the object, wherein the 3D model is derived by integrating the 3D data into the initial 3D model.

18. The method of claim 17, wherein each of the first images represents a snapshot of the object from an angle.

19. The method of claim 18, wherein the platform includes a turntable and the object is placed upon the turntable; and wherein, when the turntable rotates, the imager takes the snapshot successively to produce the sequence of the images.

20. The method of claim 17, wherein each of the certain areas of the object, without being illuminated by the structured light beam, is unobservable or otherwise difficult to be imaged by the imager.

21. The method of claim 20, wherein the taking a sequence of second images of the object comprises:

swinging the structured light beam across respectively the certain areas of the object; and imaging the object when each of the certain areas of the object is being illuminated by the structured light beam.

22. The method of claim 21, wherein the structured light beam is a laser strip projected from a laser projector.

23. The method of claim 22, wherein the laser projector is not positioned a priori in reference to the platform.

24. The method of claim 22, wherein the laser projector is a handheld type and manually operated.

25. The method of claim 21, wherein the platform includes a pair of a first panel and a second panel, the first panel and the second panel are configured to a known angel and behind the object.

26. The method of claim 25, wherein the swinging of the structured light beam is to project the structured light beam on the first panel and the second panel simultaneously at any given time.

27. The method of claim 21, wherein the platform includes a pair of a first panel and a second panel, the first panel and the second panel are so configured that each of the first images shows that the object is surrounded by the first panel and the second panel.

28. The method of claim 21, wherein the swinging of the structured light beam is to project the structured light beam on the first panel and the second panel simultaneously at any given time.

29. The method of claim 17, wherein the structured light mean is manually swung to illuminate across each of the certain areas of the object.

30. A machine-readable media for generating a 3D model of an object, the machine-readable media comprising:

program code for generating an initial 3D model of the object from a sequence of first images from an imager based on a calibration model of the imager, the object placed in reference to a platform, wherein the calibration model determines relationships between the imager and the platform;

program code for obtaining, respectively, 3D data of certain areas of the object from a sequence of second images taken by the imager when a structured light beam is swung across respectively the certain areas of the object; and program code for deriving the 3D model by integrating the 3D data into the initial 3D model.

31. The machine-readable media of claim 30, wherein each of the certain areas of the object, without being illuminated by the structured light beam, is unobservable or otherwise difficult to be imaged by the imager.

32. The machine-readable media of claim 30 further comprising program code for obtaining the calibration model of the imager before the first images are taken.

33. The machine-readable media of claim 32, wherein the program code for generating the initial 3D model comprises:

program code for receiving the sequence of first images from the imager, each of the first images representing a snapshot of the object from an angle; and program code for deriving the initial 3D model from the sequence of first images based on the calibration model.

34. The machine-readable media of claim 33, wherein the initial 3D model includes inaccuracy for at least one of the certain areas of the object.

35. The machine-readable media of claim 34, wherein the program code for deriving the 3D model comprises:

program code for applying the 3D data to the at least one of the certain areas of the object so that the inaccuracy can be corrected.

36. The machine-readable media of claim 35, wherein the program code for obtaining the 3D data comprises:

program code for detecting, from the sequence of second images, respective deformations of the structured light beam falling on each of the certain areas of the objects;

program code for deriving respective contours from the respective deformations; and program code for merging the respective contours to generate the 3D data.

37. The machine-readable media of claim 36, wherein the platform includes a pair of a first panel and a second panel, the first panel and the second panel are configured to a known angel and behind the object.

38. The machine-readable media of claim 37, wherein the laser stripe is projected on the first panel and the second panel simultaneously at any given time.

39. The machine-readable media of claim 36, wherein the platform includes a pair of a first panel and a second panel, the first panel and the second panel are so configured that each of the first images shows that the object is surrounded by the first panel and the second panel.

40. The machine-readable media of claim 39, wherein the laser strip is projected on the first panel and the second panel simultaneously at any given time.

41. The machine-readable media of claim 30, wherein the structured light beam is a laser strip projected from a laser projector.

42. The machine-readable media of claim 41, wherein the laser projector is not positioned in reference to the platform.

43. The machine-readable media of claim 42, wherein the laser projector is a handheld type and manually operated.

* * * * *